(12) United States Patent
Bates et al.

(10) Patent No.: US 9,176,573 B2
(45) Date of Patent: Nov. 3, 2015

(54) CUMULATIVE MOVEMENT ANIMATIONS (75) Inventors: Megan A. Bates, Kirkland, WA (US); Song Zou, Bellevue, WA (US); Shaojie Zhang, Bellevue, WA (US); Ross N. Luengen, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 421 days.

(21) Appl. No.: 13/343,616

(22) Filed: Jan. 4, 2012

(65) Prior Publication Data
US 2013/0169648 A1   Jul. 4, 2013

(51) Int. Cl.
*G06F 3/00* (2006.01)
*G06T 13/80* (2011.01)

(52) U.S. Cl.
CPC .. *G06F 3/00* (2013.01); *G06T 13/80* (2013.01)

(58) Field of Classification Search
CPC ............ G06F 3/0485; G06F 17/30902; G06F 3/0482; G06F 17/30864; G06F 3/0483; G06F 3/04855; G06F 17/30058; G06F 3/048; G06F 2203/0339; G06F 2203/04806; G06F 3/03547; G06F 2203/04808; G06F 3/0362; G06F 3/04847; G06F 3/04845; G06F 3/0488; G06Q 30/0256; H04N 1/00384; H04N 1/00458; H04N 5/4403; G06T 13/00; G06T 13/80; Y10S 345/901; Y10S 715/973; Y10S 15/974; H04M 1/274525; G09G 5/34; G09G 2340/045
USPC .......................................................... 345/473
See application file for complete search history.

(56) References Cited

U.S. PATENT DOCUMENTS

| | | | |
|---|---|---|---|
| 7,372,463 B2 | 5/2008 | Anand | |
| 8,935,629 B2 * | 1/2015 | Ying et al. | 715/783 |
| 2002/0027565 A1 * | 3/2002 | Syukri | 345/684 |
| 2006/0103649 A1 | 5/2006 | Whatmough | |
| 2007/0115289 A1 | 5/2007 | Goldfarb | |
| 2010/0162181 A1 * | 6/2010 | Shiplacoff et al. | 715/863 |
| 2012/0272181 A1 * | 10/2012 | Rogers et al. | 715/784 |
| 2013/0326398 A1 * | 12/2013 | Zuverink et al. | 715/784 |

OTHER PUBLICATIONS

"UIView infinite loop Animation to call a method after every repeat cycle", Retrieved at <<http://stackoverflow.com/questions/3919831/uiview-infinite-loop-animation-to-call-a-method-after-every-repeat-cycle>>, Retrieved Date: Nov. 18, 2011, pp. 4.
"Animations and Transitions", Retrieved at <<http://msdn.microsoft.com/en-us/library/windows/desktop/aa511285.aspx>>, Retrieved Date: Nov. 18, 2011, pp. 23.
Bulterman, et al., "12. SMIL 3.0 Animation", Retrieved at <<http://www.w3.org/TR/SMIL3/smil-animation.html>>, Retrieved Date: Nov. 18, 2011, pp. 57.
"Animated Transition", Retrieved at <<http://designinginterfaces.com/firstedition/index.php? p.=Animated_Transition>>, Retrieved Date: Nov. 18, 2011, pp. 2.

* cited by examiner

*Primary Examiner* — Kee M Tung
*Assistant Examiner* — Haixia Du
(74) *Attorney, Agent, or Firm* — Brian Haslam; Kate Drakos; Micky Minhas (57) ABSTRACT

Cumulative movement animation techniques are described. In one or more implementations, an output a first animation is initiated that involves a display of movement in a user interface of a computing device. An input is received by the computing device during the output of the first animation, the input configured to cause a second display of movement in the user interface. Responsive to the receipt of the input, a remaining portion of the movement of the first animation is output along with the movement of the second animation by the computing device.

20 Claims, 6 Drawing Sheets

302
Initiate an output a first animation that involves a display of movement in a user interface of a computing device

304
Receive an input by the computing device during the output of the first animation, the input configured to cause a second display of movement in the user interface

306
Responsive to the receiving of the input, output a remaining portion of the movement of the first animation along with the movement of the second animation by the computing device

402
Responsive to receipt of a first input by a computing device, initiate an output of a first scrolling animation that involves a first amount of movement for display in a user interface of the computing dev 404
Responsive to receipt of an second input by the computing device during the output of the first scrolling animation such that a portion of the first scrolling animation has not yet been output when the second input is received, output the portion of the first scrolling animation along with a second amount of movement of a second scrolling animation that corresponds to the second input in the user interface of the computing device

CUMULATIVE MOVEMENT ANIMATIONS

BACKGROUND

Users have a variety of different ways with which to navigate through a user interface. For example, a user may interact with keys of a keyboard such as "page up" or "page down" to navigate up and down through a user interface, respectively. A user may also utilize a cursor control device, such as scroll wheel of a "mouse," to move up and down or left and right in the user interface. A variety of other examples are also available to the user, such as gestures and so on.

However, conventional techniques that were utilized to display movement corresponding to this navigation could be unpredictable. Therefore, these conventional techniques may make it difficult for a user to readily determine point at which the navigation would "end up" given a particular input. For example, conventional techniques that were used to address interruptions in animations that were used to display the movement could be confusing and unpredictable. Thus, these conventional techniques could force a user to provide corrective inputs to arrive at a desired point in the user interface.

SUMMARY

Cumulative movement animation techniques are described. In one or more implementations, an output a first animation is initiated that involves a display of movement in a user interface of a computing device. An input is received by the computing device during the output of the first animation, the input configured to cause a second display of movement in the user interface. Responsive to the receipt of the input, a remaining portion of the movement of the first animation is output along with the movement of the second animation by the computing device.

In one or more implementations, a system includes an input device and one or more modules communicatively coupled to the input device and implemented at least partially in hardware. The one or more modules are configured to receive an input during an output of an first animation for display on a display device, the first animation involving a display of movement in a user interface and responsive to the input, output a remaining portion of the movement of the first animation along with movement of a second animation for display by the display device.

In one or more implementations, responsive to receipt of a first input by a computing device, an output of a first scrolling animation is initiated that involves a first amount of movement for display in a user interface of the computing device. Responsive to receipt of an second input by the computing device during the output of the first scrolling animation such that a portion of the first scrolling animation has not yet been output when the second input is received, the portion of the first scrolling animation is output along with a second amount of movement of a second scrolling animation that corresponds to the second input in the user interface of the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventionally, receipt of an input during output of an animation caused the animation to be interrupted. Therefore, remaining movement of the animation was cancelled using conventional techniques. However, this could lead to unpredictability in the animations when used for navigation. For example, a user may not be able to readily determine where the user interface will "land" given inputs provided to a computing device, especially if one or more of those inputs were provided during output of another animation.

Cumulative movement techniques are described. In one or more implementations, a remaining distance involved in an animation is preserved, which may add predictability to animations involving movement in a user interface. For example, an input for a "page down" may be received during output of a scrolling animation for a previous page down input, e.g., these inputs may be provided using successive presses of a page down key of a keyboard.

In response, the computing device may begin the next scrolling animation, but take the remainder of the distance from the first scrolling animation that has not yet been output and append this remainder to the distance of the second scrolling animation. Additionally, the velocity of the second scrolling animation may be increased to travel this larger distance in substantially similar amount of time. Thus, the computing device may support improved responsiveness to the user (e.g., by instantly interrupting the first animation to respond to the input) but preserves distance predictability such that navigation techniques such as mouse scrolling, page up/page down keys, and so on travel a predictable distance. A variety of other examples are also contemplated, further discussion of which may be found in relation to the following figure.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
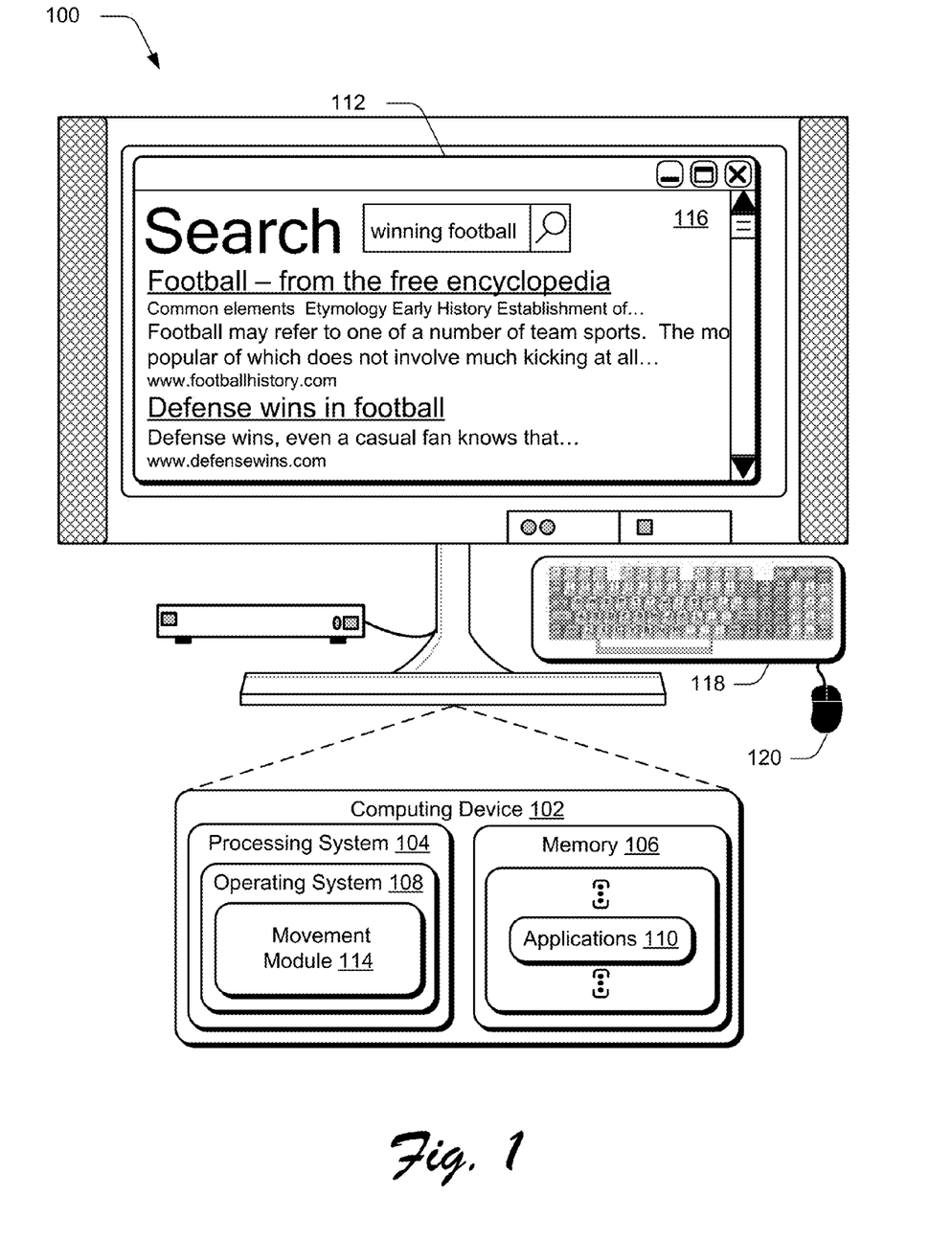
FIG. 1 is an illustration of an environment in an example implementation that is operable to employ cumulative movement animation techniques.

FIG. 1 is an illustration of an environment 100 in an example implementation that is operable to employ cumulative movement techniques described herein. The illustrated environment 100 includes a computing device 102, which may be configured in a variety of ways. For example, the computing device 102 may be configured as a desktop computer, a mobile station, an entertainment appliance, a set-top box communicatively coupled to a display device, a wireless phone, a slate (e.g., a tablet), a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as a remote control and set-top box combination, an image capture device and a game console configured to capture gestures, and so on.

The computing device 102 is further illustrated as including a processing system 104 and memory 106. The processing system 104 is representative of functionality of the computing device 102 to perform one or more operations, such as through execution of instructions, configuration as one or more functional blocks, implemented "in silicon" such as through an application specific integrated circuit, and so on.

The computing device 102 is further illustrated as including an operating system 108. The operating system 108 is configured to abstract underlying functionality of the computing device 102 to applications 110 that are executable on the computing device 102. For example, the operating system 108 may abstract the processing system 104, memory 106, network, and/or display functionality (e.g., a display device 112) of the computing device 102 such that the applications 110 may be written without knowing "how" this underlying functionality is implemented. The application 110, for instance, may provide data to the operating system 108 to be rendered and displayed by the display device 112 without understanding how this rendering will be performed. The operating system 108 may also represent a variety of other functionality, such as to manage a file system and user interface that is navigable by a user of the computing device 102.

The operating system 108 is also illustrated as including a movement module 114. The movement module 114 is representative of functionality to navigate through a user interface 116 output for display on a display device 112. The illustrated user interface 116, for instance, is configured to include search results in an amount that is greater than can be displayed on the display device at any one time. Accordingly, the movement module 114 may support techniques that may be used to navigate through the user interface 116 to view portions of interest.

This navigation may be performed in a variety of ways. For example, the computing device 102 may receive one or more inputs from a user, such as through interaction with a keyboard 118 by pressing a page up or page down button. In another example, this navigation may be performed by using a cursor control device 120, such as a scroll wheel of the cursor control device 120. A user, for instance may rotate the scroll wheel away from the user to move "up" and toward the user to move "down" in the user interface. Additionally, a user may also navigate side-to-side, such as through a key combination and use of the scroll wheel (e.g., holding a shift key and movement of the scroll wheel to move left or right), use of a tilting scroll wheel, and so on. A variety of other examples are also contemplated, such as to support gestures (e.g., a pan or flick) that may be detected using touchscreen functionality (e.g., of the display device 112 or track pad), movement detected using a camera (e.g., a depth sensing camera to detect skeletal movement), and so forth.

As previously described, conventional techniques made it difficult for a user to navigate the user interface 116. This was due to the lack of predictability of these conventional techniques such that a user was not readily able to determine an amount of navigation that would be performed for each input. This may be caused by the interruption caused in traditional techniques when an input was received during the output of the animation, which would result in a cancellation of the animation at that point. In the techniques described herein, however, the movement module 114 may support cumulative movements such that the navigation may be predictable, further discussion of which may be found in relation to FIG. 2.

Generally, any of the functions described herein can be implemented using software, firmware, hardware (e.g., fixed logic circuitry), or a combination of these implementations. The terms "module," "functionality," and "engine" as used herein generally represent software, firmware, hardware, or a combination thereof. In the case of a software implementation, the module, functionality, or engine represents program code that performs specified tasks when executed on a processor (e.g., CPU or CPUs) and is storable in one or more computer readable storage devices and thus is implementable at least partially in hardware. The features of the techniques described below are platform-independent, meaning that the techniques may be implemented on a variety of commercial computing platforms having a variety of processors.

For example, a computing device may also include an entity (e.g., software) that causes hardware of the computing device to perform operations, e.g., processors, functional blocks, and so on. For example, the computing device may include a computer-readable medium that may be configured to maintain instructions that cause the computing device, and more particularly hardware of the computing device to perform operations. Thus, the instructions function to configure the hardware to perform the operations and in this way result in transformation of the hardware to perform functions. The instructions may be provided by the computer-readable medium to the computing device through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
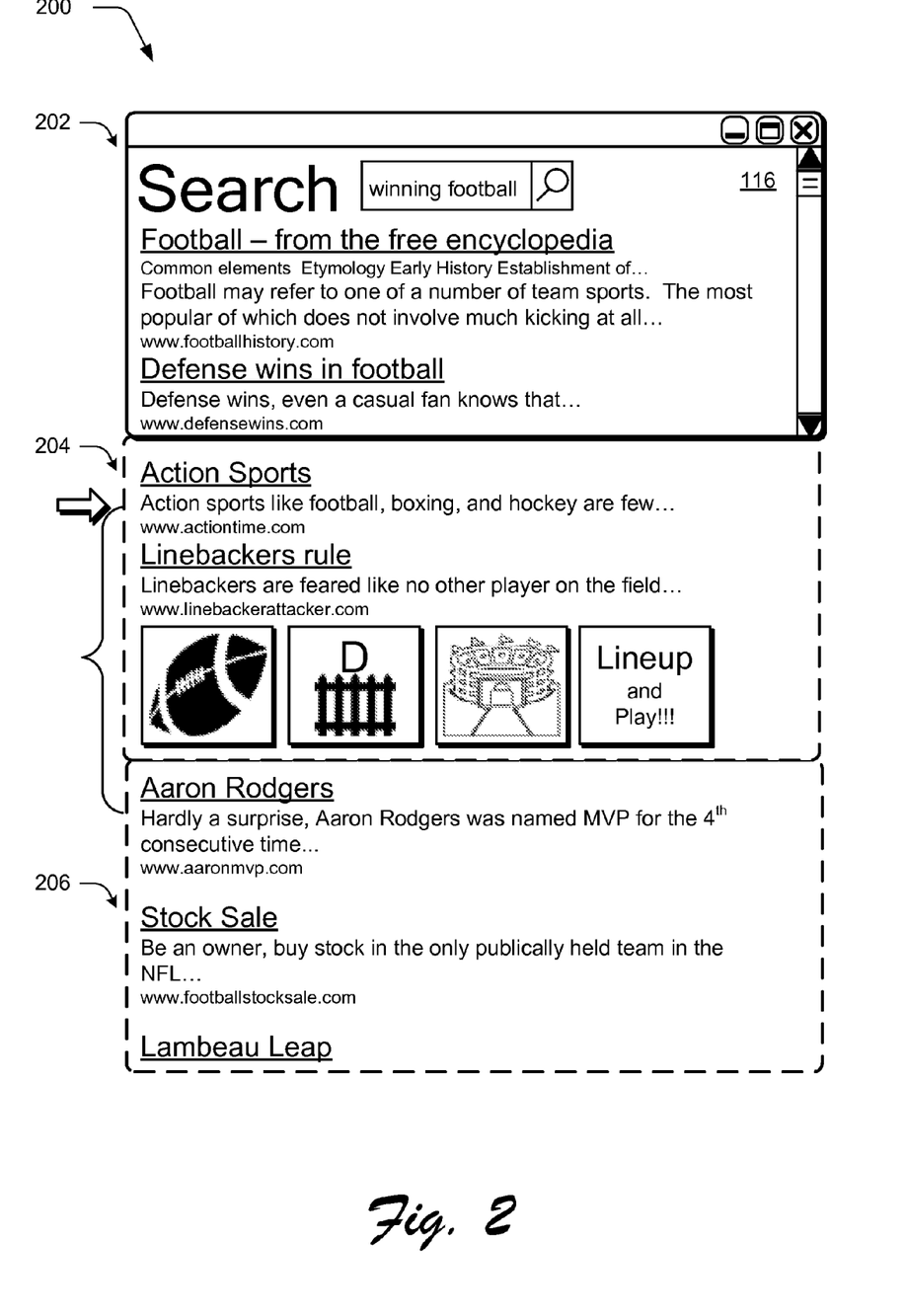
FIG. 2 is an illustration of an example implementation in which a user interface of FIG. 1 is shown in greater detail.

FIG. 2 is an illustration of an example implementation 200 in which the user interface 116 of FIG. 1 is shown in greater detail. The user interface 116 in this example is shown having first, second, and third sections 202, 204, 206. Each of these sections represents an amount of the user interface 116 that is displayable at any one point in time, e.g., in a current window and/or by the display device 112 at a given magnification.

The first section 202 is illustrated in a box as being currently displayed by the display device 112, whereas the second and third sections 204, 206 are illustrated in phantom. In this example, an input is received during the display of the first section 202. As previously described, this may be performed in a variety of ways, such as by pressing a page down button of a keyboard 118, a notch of a scroll wheel of the cursor control device 120, a gesture, and so on.

In response, the movement module 114 of the computing device 102 may initiate an animation to begin display of the second portion 204. This may be performed in a variety of ways, such as to display a scrolling animation in which parts of the second portion 204 are moved "onscreen" for display on the display device 112 as parts of the first portion 202 are moved "off screen." Thus, in this example, parts of the second portion 204 are used to replace parts of the first portion 202 during the animation. It should be readily apparent that a wide variety of other examples of animations involving movement are also contemplated as well as different amounts that may be involved in the movement, e.g., such as to keep a part of the first portion 202 displayed with a part of the second portion 204 and so on.

As the animation to display the second portion is output 204 for display on the display device 112, another input may be received from a user to continue movement in the user interface 116. This input may be the same as or different from the input that was received to output the second portion. In this example, the input also is configured to cause the movement module 114 to navigate downward through the user interface 116.

The input is illustrated through use of an arrow in relation to the user interface 116 to indicate a point at which the input was received in the output of the animation involving the display of the second portion 204. For example, the referenced arrow indicates that a part of the second portion 204 that includes "Action Sports" has been output for display by the display device 112. However, other parts of the second portion that are "below" the arrow have yet to be output.

Using conventional techniques, continued output of the animation ceased when the input was received during the output of the animation. Also, output of a new animation is started as specified by the input, such as to "page down" a defined amount. Because of this, this amount of movement caused by the second input was based on a current location in the user interface 116 at which the input was received using conventional techniques. This amount is illustrated in the example implementation 200 of the user interface 116 by a bracket that is positioned below the arrow.

The movement module 114 described herein, however, may be configured to support cumulative movement animations. Continuing with the previous example, the input referenced through use of the arrow may be received during output of the animation to display the first portion, e.g., through pressing of a page down button. Responsive to this input, the movement module 114 may display an animation that involves movement that includes both a remaining part of the second portion 204 as well the third portion 206.

In one or more implementations, this animation may be output in an amount of time that approximates an amount of time in which the animation of the output of the third portion 206 would take alone. This may be performed in a variety of ways, such as to increase a scrolling velocity for the animation to output the parts of the second portion 204 and third portion 206 in relation to a scrolling velocity used initially by the animation to scroll the second portion 204, itself. Thus, the amount of movement is the same regardless of a speed at which inputs are received by the movement module 114 to navigate through the user interface 116. In this way, the movement module 114 may support predictable navigation through the user interface 116.

In this example, successive inputs and animations were described which involved movement in a corresponding direction. Thus, the second animation in this example did not run counter to the movement of the first animation. A variety of other examples are also contemplated. For example, the movement defined by the animations may involve different directions, e.g., the first and second inputs may be configured to move the user interface in directions that are perpendicular to each other. In such an example, animations involving this movement may also be cumulative, e.g., an entirety of the movement defined for the first animation may be output followed by an entirety of the movement defined for the second animation.

In another example, the movement defined by the inputs may run counter to each other. For instance, a first animation may be output as previously described to page down from the first portion 202 to the section portion 204, such as a page down, movement of a scroll wheel, a gesture, and so on. As before, an input may be received during the output of the first animation as before. However, in this example the movement that corresponds to the input for a second animation runs counter to the movement for the first animation. Accordingly, the movement module 114 may make such a determination of this countered movement and in response configure the second animation to involve an amount of movement that counters this first movement. Therefore, in this instance the amount of movement for the second animation approximates an amount of movement already performed for the first animation. Thus, the second animation may be utilized to "undo" the effect of the first animation and return the user interface 116 to its previous location as before the first animation was output, e.g., to display the first portion 116. In this way, the movement module 114 may also support predictable behavior to move through the user interface 116. Additional discussion of movement through a user interface may be found in relation to the following procedures.

Example Procedures

The following discussion describes cumulative movement animation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the example implementation 200 of FIG. 2.

Figure 3:
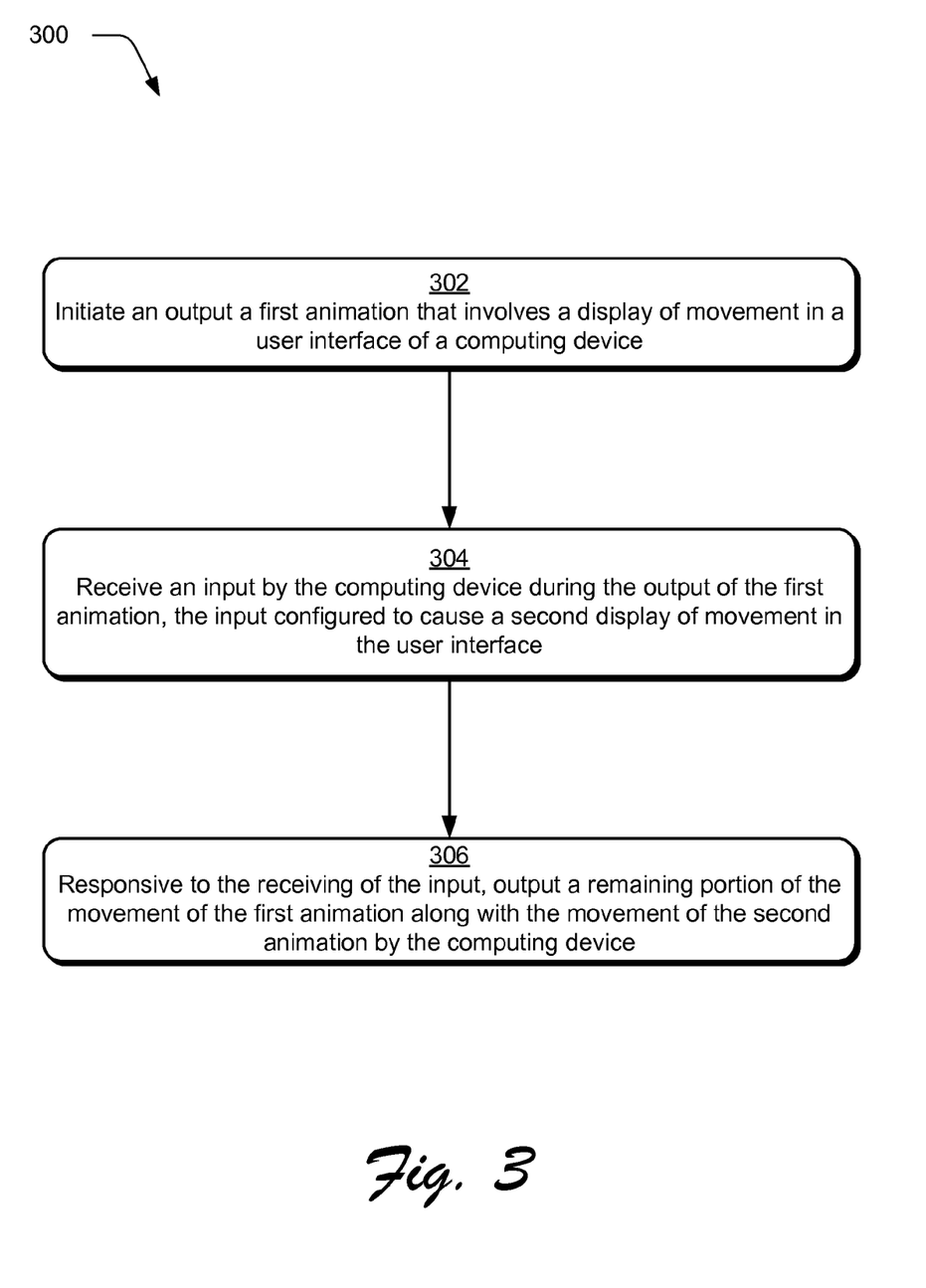
FIG. 3 is a flow diagram depicting a procedure in an example implementation in which movement through a user interface involving animations and successive inputs is described.

FIG. 3 depicts a procedure 300 in an example implementation in which movement through a user interface involving animations and successive inputs is described. Output of a first animation is initiated that involves a display of movement in a user interface (block 302). The movement module 114 of the computing device 102, for instance, may initiate output a first animation responsive to a first input. As previously described, the first input may be provided in a variety of ways, such as by a keyboard 118, cursor control device 120, recognition of a gesture, and so on.

An input is received by the computing device during the output of the first animation, the input configured to cause a second display of movement in the user interface (block 304). As described in relation to FIG. 2, for instance, an input may be received at a point in time during the output of an animation to display the second portion 204 of the user interface 116 as indicated by the arrow.

Responsive to the receipt of the input, a remaining portion of the movement of the first animation is output along with the movement of the second animation by the computing device (block 306). The remaining portion that is below the arrow yet within the second portion 204 may be added to the third portion 206 in this example. This cumulative amount of the user interface 116 may then be the subject of the second animation. As previously described, in one or more implementations this cumulative amount may be output by the second animation in an amount of time that approximates an amount of time that would be used by the second animation to display the movement of the second animation, otherwise. This may be performed by increasing a velocity at which the animation displays parts of this cumulative amount by the movement module 114. A variety of other examples are also contemplated.

Figure 4:
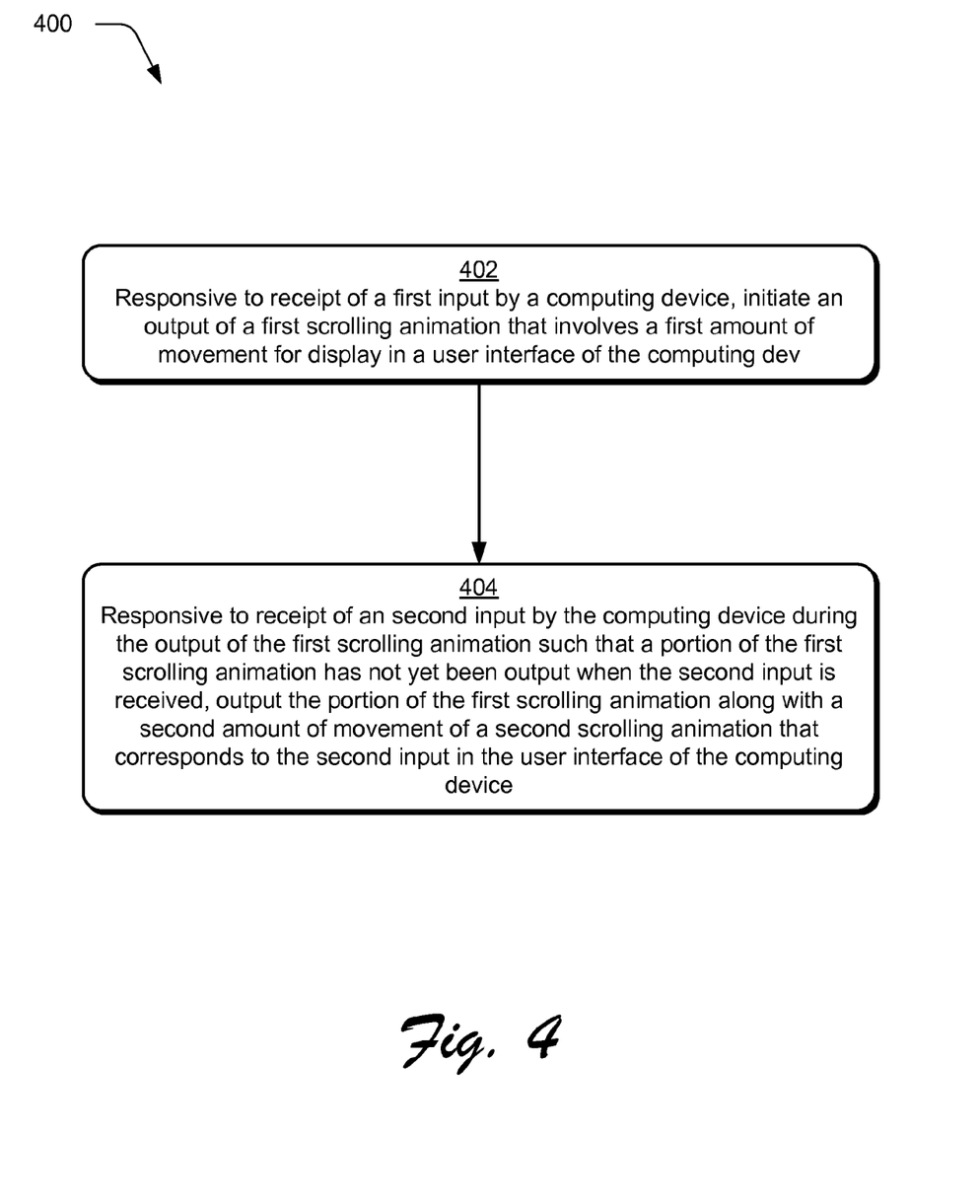
FIG. 4 is a flow diagram depicting a procedure in an example implementation in which scrolling animations are output to navigate through a user interface.

FIG. 4 depicts a procedure 400 in an example implementation in which scrolling animations are output to navigate through a user interface. Responsive to receipt of a first input by a computing device, an output of a first scrolling animation is initiated that involves a first amount of movement for display in a user interface of the computing device (block 402). The animation in this case is a scrolling animation that involves a defined amount of movement as previously described.

Responsive to receipt of an second input by the computing device during the output of the first scrolling animation such that a portion of the first scrolling animation has not yet been output when the second input is received, the portion of the first scrolling animation is output along with a second amount of movement of a second scrolling animation that corresponds to the second input in the user interface of the computing device (block 404). Thus, in this example, a cumulative amount that includes a portion of the first scrolling animation that has not yet been output is added to an amount defined for the second animation. In this way, the movement module 114 may support predictable behavior for movement "through" the user interface 116.

Example System and Device

Figure 5:
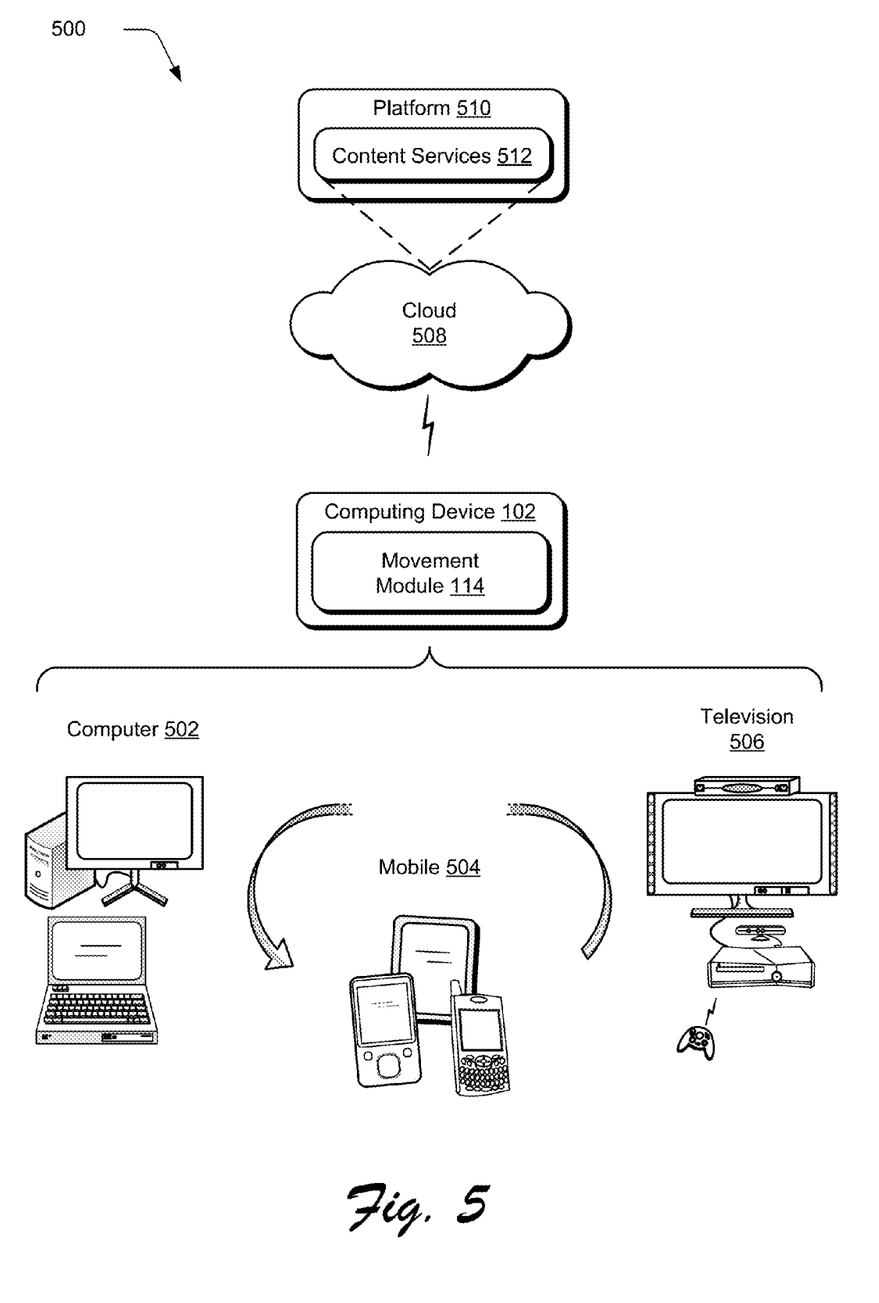
FIG. 5 illustrates an example system that includes the computing device as described with reference to FIG. 1.

FIG. 5 illustrates an example system 500 that includes the computing device 102 as described with reference to FIG. 1. The example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 502, mobile 504, and television 506 uses. Each of these configurations includes devices that may have generally different constructs and capabilities, and thus the computing device 102 may be configured according to one or more of the different device classes. For instance, the computing device 102 may be implemented as the computer 502 class of a device that includes a personal computer, desktop computer, a multi-screen computer, laptop computer, netbook, and so on.

The computing device 102 may also be implemented as the mobile 504 class of device that includes mobile devices, such as a mobile phone, portable music player, portable gaming device, a tablet computer, a multi-screen computer, and so on. The computing device 102 may also be implemented as the television 506 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein. This is illustrated through inclusion of the movement module 114 on the computing device 102. However, it should be readily apparent that the techniques described herein may be implemented in whole or in part by a distributed environment, such as in the cloud 508 by a platform 510 support by the cloud as described below.

The cloud 508 includes and/or is representative of a platform 510 for content services 512. The platform 510 abstracts underlying functionality of hardware (e.g., servers) and software resources of the cloud 508. The content services 512 may include applications and/or data that can be utilized while computer processing is executed on servers that are remote from the computing device 102. Content services 512 can be provided as a service over the Internet and/or through a subscriber network, such as a cellular or Wi-Fi network.

The platform 510 may abstract resources and functions to connect the computing device 102 with other computing devices. The platform 510 may also serve to abstract scaling of resources to provide a corresponding level of scale to encountered demand for the content services 512 that are implemented via the platform 510. Accordingly, in an interconnected device embodiment, implementation of functionality of the functionality described herein may be distributed throughout the system 500. For example, the functionality may be implemented in part on the computing device 102 as well as via the platform 510 that abstracts the functionality of the cloud 508.

Figure 6:
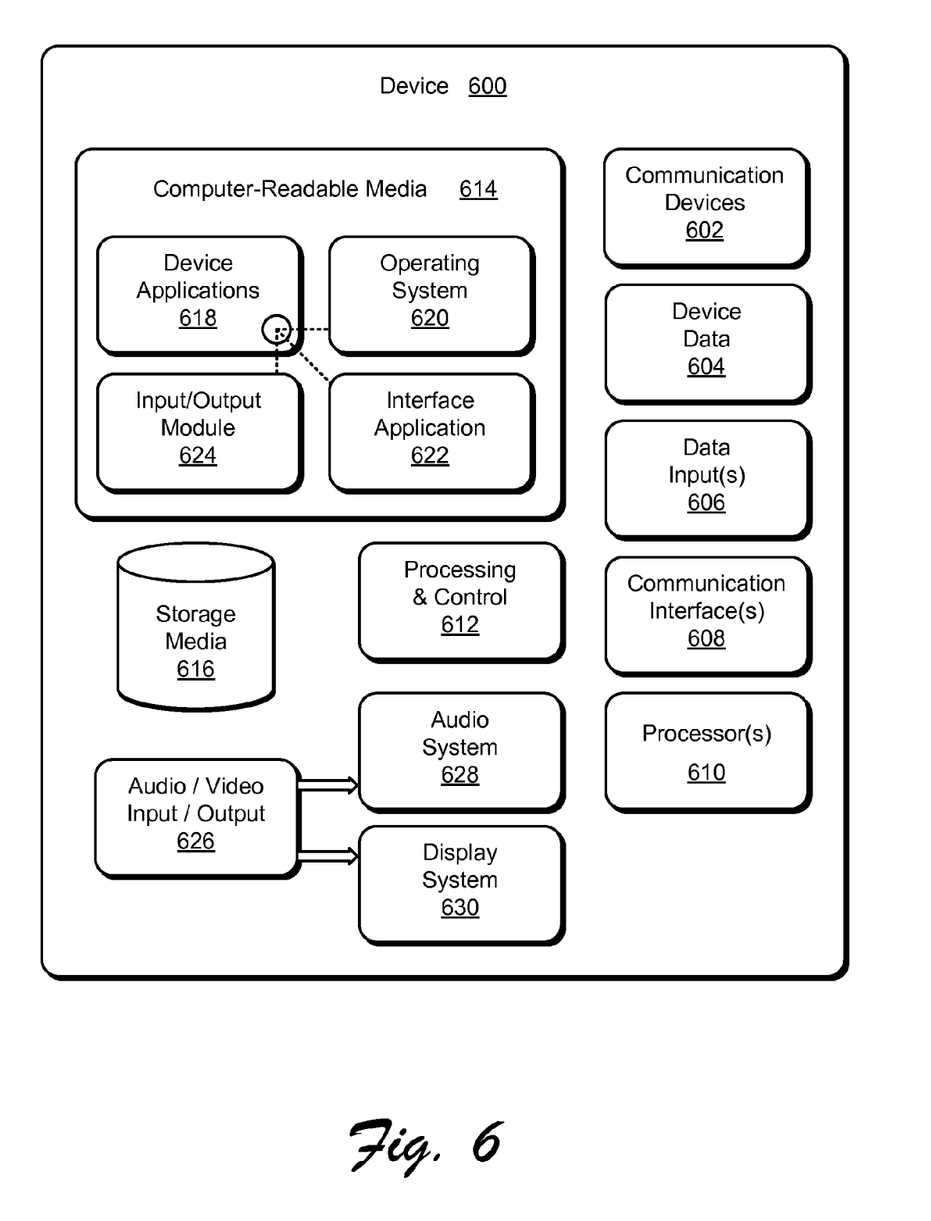
FIG. 6 illustrates various components of an example device that can be implemented as any type of computing device as described with reference to FIGS. 1, 2, and 5 to implement embodiments of the techniques described herein.

FIG. 6 illustrates various components of an example device 600 that can be implemented as any type of computing device as described with reference to FIGS. 1, 2, and 5 to implement embodiments of the techniques described herein. Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments of the techniques described herein. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.). The device applications 618 also include any system components or modules to implement embodiments of the techniques described herein. In this example, the device applications 618 include an interface application 622 and an input/output module 624 that are shown as software modules and/or computer applications. The input/output module 624 is representative of software that is used to provide an interface with a device configured to capture inputs, such as a touchscreen, track pad, camera, microphone, and so on. Alternatively or in addition, the interface application 622 and the input/output module 624 can be implemented as hardware, software, firmware, or any combination thereof. Additionally, the input/output module 624 may be configured to support multiple input devices, such as separate devices to capture visual and audio inputs, respectively.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   initiating an output of a first animation that involves a display of a first amount of movement, the first amount directly defined by a first input, in a user interface of a computing device;
   receiving a second input that is distinct from the first input by the computing device during the output of the first animation, the second input configured to cause a second display of a second amount of movement in the user interface, the second amount of movement defined directly by the second input; and
   responsive to the receiving of the second input, completing outputting a remaining portion of the first amount of movement of the first animation immediately followed by the movement of the second animation by the computing device.

2. A method as described in claim 1, wherein the receiving of the second input is performed during the output of the movement of the first animation such that the remaining portion of the movement of the first animation is not yet output by the computing device.

3. A method as described in claim 1, wherein the first animation or the second animation is a scrolling animation.

4. A method as described in claim 1, wherein the outputting of the remaining portion of the first amount of movement of the first animation along with the movement of the second animation is performed in an amount of time that approximates an amount of time that otherwise would be used to output the movement of the second animation by the computing device.

5. A method as described in claim 4, wherein the amount of time that otherwise would be used to output the movement of the second animation by the computing device is the amount of time taken to output the second animation that does not involve an interruption.

6. A method as described in claim 1, wherein the outputting of the remaining portion of the first amount of movement of the first animation along with the movement of the second animation is performed responsive to a determination that the movement of the second animation does not counter at least a portion of the movement of the first animation.

7. A method as described in claim 6, further comprising responsive to a determination that the movement of the second animation does counter at least the portion of the movement of the first animation, outputting a third animation having movement that counters at least the portion of the movement of the first animation that was output by the computing device.

8. A method as described in claim 1, wherein the input is provided using a keyboard, cursor control device, or gesture.

9. A method as described in claim 8, wherein the input is provided using a page up key, a page down key, or through scrolling using the cursor control device.

10. A system comprising:
an input device; and
one or more modules implemented at least partially in hardware and communicatively coupled to the input device, the one or more modules configured to receive a second input gesture that is distinct from a first input gesture by a user during an output of a first animation for display on a display device, each input gesture relating to a distinct defined amount of distance to be animated, the first animation involving a display of movement defined by the first input gesture in a user interface and responsive to the second input gesture, output a remaining portion of the defined amount of movement of the first animation followed without interruption by a defined amount of movement of a second animation for display by the display device.

11. A system as described in claim 10, wherein the first animation or the second animation is a scrolling animation.

12. A system as described in claim 10, wherein the output of the remaining portion of the defined amount of movement of the first animation along with the movement of the second animation is performed by the one or more modules in an amount of time that approximates an amount of time that otherwise would be used to output the movement of the second animation, alone.

13. A system as described in claim 10, wherein the output of the remaining portion of the defined amount of movement of the first animation along with the movement of the second animation is performed responsive to a determination by the one or more modules that the movement of the second animation does not counter at least a portion of the movement of the first animation.

14. A system as described in claim 13, further comprising responsive to a determination that the defined amount of movement of the second animation does counter at least the portion of the defined amount of movement of the first animation, outputting a third animation having movement that counters at least the portion of the movement of the first animation that was output by the computing device.

15. A system as described in claim 10, wherein the input gesture is provided using a touchscreen, trackpad, motion sensing camera, or depth sensing camera.

16. A method comprising:
responsive to receipt of a first input by a computing device, initiating an output of a first scrolling animation that involves a first amount of movement defined by the first input for display in a user interface of the computing device; and
responsive to receipt of a second input that is distinct from the first input by the computing device during the output of the first scrolling animation such that a portion of the first scrolling animation has not yet been output when the second input is received, outputting the portion of the first scrolling animation followed without interruption by a second amount of movement of a second scrolling animation defined by the second input in the user interface of the computing device.

17. A method as described in claim 16, wherein the output of the remaining portion of the movement of the first scrolling animation along with the movement of the second scrolling animation is performed by the one or more modules in an amount of time that approximates an amount of time that otherwise would be used to output the movement of the second scrolling animation, alone.

18. A method as described in claim 16, wherein the output of the remaining portion of the movement of the first scrolling animation along with the movement of the second scrolling animation is performed responsive to a determination by the computing device that the movement of the second scrolling animation is in a matching direction to that of the first scrolling animation.

19. A method as described in claim 18, further comprising responsive to a determination by the computing device that the amount of movement of the second animation is not in the matching direction to that of the first scrolling animation, outputting a third animation having movement that removes an amount of the movement that has been display in conjunction with the first scrolling animation.

20. A method as described in claim 16, wherein the first and second inputs are provided, respectively, using at least one of a keyboard, cursor control device, or gesture.

* * * * *